United States Patent [19]

Friedland et al.

[11] 4,275,037

[45] Jun. 23, 1981

[54] STRIPPING METALS FROM ORGANIC SOLVENT WITH AQUEOUS SOLUTION OF POLYMERIC PHOSPHATES

[75] Inventors: David J. Friedland, Snyder; Floyd L. Tewksbury, Williamsville; Martin A. Robinson, East Amherst, all of N.Y.

[73] Assignee: Allied Chemical Corporation, Morris Township, Morris County, N.J.

[21] Appl. No.: 973,268

[22] Filed: Dec. 26, 1978

[51] Int. Cl.$^3$ .............................................. C01G 43/00

[52] U.S. Cl. .......................................... 423/8; 423/9; 423/10; 423/20

[58] Field of Search ...................... 423/10, 18, 8, 20, 9

[56] References Cited

U.S. PATENT DOCUMENTS

| | | | |
|---|---|---|---|
| 2,859,094 | 11/1958 | Schmitt et al. | 423/10 |
| 2,869,979 | 1/1959 | Grinstead | 423/10 |
| 2,882,123 | 4/1959 | Long | 423/18 |
| 2,937,925 | 5/1960 | Blake et al. | 423/10 |
| 3,558,300 | 1/1971 | Wagner | 71/34 |
| 3,607,018 | 9/1971 | Moore | 423/313 |
| 3,711,591 | 1/1973 | Hurst et al. | 423/10 |
| 3,737,513 | 6/1973 | Wiewiorowski et al. | 423/11 |
| 3,835,214 | 9/1974 | Hurst et al. | 423/10 |

*Primary Examiner*—Edward A. Miller

*Attorney, Agent, or Firm*—Alan M. Doernberg; Jay P. Friedenson

[57] ABSTRACT

Certain metals, and especially uranium, are recovered from an organic solvent by stripping with an aqueous solution containing polymeric phosphates under conditions in which the polymeric phosphate does not quickly hydrolize and metal preferentially dissolves in the aqueous solution. The metal may then be recovered from the aqueous solution by hydrolizing the polymeric phosphates and either precipitating the metal or reextracting the metal at higher concentrations with an organic solvent containing extractants.

6 Claims, No Drawings

STRIPPING METALS FROM ORGANIC SOLVENT WITH AQUEOUS SOLUTION OF POLYMERIC PHOSPHATES

BACKGROUND OF THE INVENTION

Processes are known for recovering uranium values from "wet process" phosphoric acid by concentration and purification. The first cycle generally involves extracting uranium from the phosphoric acid to an organic phase generally containing organic extractants such as a combination of a dialkylphosphoric acid and a trialkylphosphine oxide. The second cycle generally involves stripping the uranium from the organic solution with an aqueous phosphoric acid and reextracting uranium into an organic solution containing extractants. This second organic solution is typically washed to remove excess phosphoric acid and stripped with an ammonium carbonate solution to form insoluble ammonium uranyl tricarbonate (AUT). AUT can then be filtered, washed and calcined to yield a uranium oxide product.

In some such processes, the uranium is oxidized to a hexavalent state before each extraction and reduced to a tetravalent state before the first stripping step, since the hexavalent uranium is preferentially dissolved in the organic solution and the tetravalent uranium is preferentially dissolved in the aqueous solution. In some processes, however, the extractant is chosen such that the organic solution preferentially absorbs tetravalent uranium such that uranium is extracted into the organic phase in a tetravalent state and stripped from the organic solution in a hexavalent state.

Such processes suffer from the disadvantages involved in oxidation and reduction of uranium between successive steps. In addition, the preferential solubility of uranium ions in the desired phase is generally not sufficient to effect a relatively complete transfer in the desired direction.

BRIEF DESCRIPTION OF THE INVENTION

The present invention includes a process of stripping a metal such as uranium from an organic solution containing an organic extractant and said metal which comprises contacting said solution with an aqueous solution of polymeric phosphates under conditions in which the polymeric phosphate does not rapidly hydrolyze and in which the metal preferentially dissolves in said aqueous solution. The present invention also includes processes further comprising recovering said metal from said aqueous solution by hydrolyzing said polymeric phosphates to ortho phosphates. The metal can then be either precipitated or reextracted from the aqueous solution containing ortho phosphates.

DETAILED DESCRIPTION OF THE INVENTION

The present invention relates to an improved step of stripping a metal from an organic solution containing extractants into an aqueous solution by employing an aqueous solution of polymeric phosphates. Thus the term "polymeric phosphates" refers to inorganic polymeric phosphoric acids or salts thereof. By "polymeric phosphates" is meant pyrophosphoric acid, pyrophosphate salts and higher polymeric forms, both neutralized and unneutralized. Such materials can be shown in their acid forms by the formula:

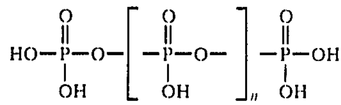

wherein n can be 0 or higher, and is generally between about 0 and 10. Such polymeric phosphoric acid, also known as polyphosphoric acid, is formed by the dehydration of ortho phosphoric acid. Such polymeric phosphates may also be salts such as ammonium polyphosphate, potassium polyphosphate, and sodium polyphosphate. Ammonium and potassium polyphosphates are especially preferred since they have wide utility in fertilizer applications and are generally available. An exemplary method for preparing water-soluble polyphosphates is described in U.S. Pat. No. 3,607,018 to Moore et al.

The concentration of such polymeric phosphates in the aqueous solution used in the process of the present invention is not critical. In general, however, very dilute solutions of polymeric phosphates are relatively inefficient at stripping metals such as uranium from organic solution containing extractants and are thus less preferred. Highly concentrated solutions of polymeric phosphates are also somewhat less preferred since their high viscosity may render difficult mixing the organic and aqueous phases. This viscosity is typically a function both of degree of polymerization (n in the above formula) and concentration of polymeric phosphates. In general, when the polymeric phosphate contains a mixture of molecules or ions with n being between 0 and 10 in the above formula, then concentrations of phosphates between about 3 and about 40 weight percent of the aqueous solution (as $P_2O_5$) are preferred, and concentrations between about 6 and about 34 weight percent are more preferred.

The conditions of stripping should be such that the polymeric phosphates are not rapidly hydrolyzed. Preferably, the pH is at least about 6 and, preferably, the temperature is between about 0° C. and 100° C. More acid conditions may lead to hydrolysis of the polymeric phosphates unless the temperature is relatively low. Low temperatures, such as below about room temperature, are less preferred because of an increase in the viscosity of the aqueous solution. High temperatures are less preferred because of energy cost and because of a possible increase in the rate of hydrolysis.

The organic solution from which metal is extracted is also not critical to the present invention. Known organic solvents such as kerosene, toluene, p-xylene, o-xylene and ethyl benzene may be used, provided that the boiling point of the solvent is above the temperature used in the process. The extractant in the organic solution is also not critical to the present invention, with several known classes of extractants for uranium being preferred. Exemplary are dialkyl phosphoric acids such as di(2-ethylhexyl) phosphoric acid (D2EHPA), trialkyl phosphine oxides such as tri-octylphosphine oxide (TOPO), mono- and di-esters of substituted phenol and phosphoric acid such as mono- and di-(octylphenyl) ortho phosphate esters. It will be appreciated that the use of such extractants in organic solvents to extract matels such as uranium from aqueous solutions is known to the prior art and described, for example, in U.S. Pat. Nos. 3,711,591, 3,737,513 and 3,835,214. In general the first two extractants are used in combination to extract hexavalent uranium from aqueous solutions such as wet process phosphoric acid, while the third extractant is used to extract tetravalent uranium from aqueous solutions such as phosphoric acid.

The present invention is not limited to uranium as the metal stripped from the organic solution, although uranium is preferred. Other metals which may be stripped from an organic solution containing an extractant and the metal according to the present invention include magnesium, aluminum and copper.

The present invention employs the chelating effect of polyphosphates to strip metals such as uranium from organic solution containing extractant and metal. As shown in the examples, polymeric phosphates exhibit both a rapid rate of stripping and a high loading capacity for metal. The stripping process is preferably performed with intimate contacting of the aqueous and organic solutions in a mixer-settler, column extractor, Graesser contactor or centrifugal contactor.

The present invention also includes the step of recovering the metal from the aqueous solution containing polymeric phosphates. By hydrolyzing the polymeric phosphates completely or substantially completely to ortho phosphates (including ortho phosphoric acid) the chelating effect is largly dissipated. Accordingly, hydrolysis of the polymeric phosphates in the aqueous solution may precipitate much or all of the metal which can then be recovered by filtration or centrifugation. Dissolved metal, including metal dissolved by other chelating agents such as tartaric acid, oxalic acid, EDTA, citric acid and mixtures thereof may either still form precipitates or form an aqueous solution of ortho phosphates with the metal still dissolved. Since, however, the capacity and preferential solubility of the metal in the aqueous solution is sharply reduced by the hydrolysis, the metal can then be reextracted by contacting the aqueous solution with a conventional organic solution containing extractants as are known for stripping the metal from wet process phosphoric acid and other such solutions. In general, since successively decreasing volumes of first organic solution, aqueous solution and second organic solution would be used in such a process, the metal is increasingly concentrated and purified as it is extracted, stripped and reextracted. As described in the prior art such as U.S. Pat. No. 3,737,513, such successive steps permit the uranium to be stripped from the second organic solution with ammonium carbonate solutions without substantial introduction of ammonium into the wet process phosphoric acid which may be further processed for fertilizer applications. Additionally, the loss of phosphoric acid, especially during the washing step, is minimized.

DESCRIPTION OF THE PREFERRED EMBODIMENT

In the FIGURE is shown schematically a process wherein the present stripping hydrolysis and recovery steps are employed. Stream 10 represents wet process phosphoric acid as is commericially available and used in the production of various fertilizer products. This stream is introduced into mixer 11 where it is intimately contacted with stream 12, an organic solution of, for example, kerosene containing D2EHPA and TOPO. Uranium is extracted from stream 10 into stream 12 in mixer 11. From mixer 11 stream 12 then proceeds to mixer 13 where it is intimately contacted with an aqueous solution in stream 14 containing polymeric phosphates such as Poly N solution, a trademarked product the Agricultural Chemicals Division of Allied Chemical Corporation, whose composition is described in the examples that follow. This stream 14 strips the uranium ions from the organic solution of stream 12. The aqueous stream 14 is then acidified, as by addition of concentrated sulfuric acid in stream 15, and hydrolyzed in vessel 16 at elevated temperature such as 80° C. The aqueous stream 17, now containing phosphate essentially completely in the ortho or non-polymeric form is then contacted in mixer 18 with an organic solution containing extractants in stream 19 which may contain the same solution as the organic solution in stream 12. Excess phosphoric acid is then removed from the organic solution in stream 19 by water washing in mixer 20. An ammonium carbonate solution such as an aqueous solution of ammonium hydroxide and ammonium carbonate is then introduced in stream 21 to form insoluble ammonium uranyl tricarbonate which can be precipitated in precipitator 22 and removed in stream 23 for washing and calcination to form uranium oxide.

As is conventional, the process phosphoric acid from which uranium has been extracted (stream 10 after leaving mixer 11) can be further processed for fertilizer applications. In addition, the aqueous solution of artho phosphoric acid in stream 17 after leaving mixer 18 can also be further processed for fertilizer applications, either by resynthesis of polymeric phosphates by conventional techniques or otherwise. In general, the flow rates in stream 14 and 17 will be substantially less than in stream 10; and, similarly, the flow rate in stream 19 will be substantially less than in stream 12. Since substantially all of the uranium extracted in mixer 11 is eventually stripped and recovered in precipitator 22, the decreased flows from one stream to the next represent increasing concentrations of uranium. Most uranium originally present in the polymeric phosphate containing aqueous solution of stream 14 will also be extracted in mixer 18 and stripped and precipitated in precipitator 22.

EXAMPLE 1

Stripping of Uranium By Aqueous Polyphosphate Solution 66.7 milligrams of uranyl nitrate hexahydrate was dissolved in 100 milliliters of a solution of kerosene with 0.5 molar di(2-ethylhexyl) phosphoric acid (D2EHPA) and trioctyl phosphine oxide (TOPO) to give a concentration of 316 ppm. Five milliliters of this organic solution were contacted for three minutes at 40° C. in a test tube agitated with a Vortex mixer by an aqueous polymeric phosphate solution sold by Allied Chemical Corporation as Poly N solution. It contained about 28% polymeric phosphates (primarily pyrophosphate and tripoly phosphate), about 10% nitrogen and about 16% orthophosphates, had a pH of about 6–7 and had an initial uranium content of about 174 ppm. After the three minutes, the phases were allowed to separate and then the separated phases allowed to stand for one hour. Then the aqueous phase was filtered through filter paper to remove organics. The concentration of uranium in the aqueous phase was then determined to be about 343 ppm by colorimetric analysis. Since there was twice as much aqueous as organic phase by volume, complete stripping of 316 ppm from the organic phase should have produced a 158 ppm increase in the uranium of the aqueous phase, from 174 ppm to 332 ppm. The higher measured uranium concentration of 343 ppm indicates that, within experimental error, all of the uranium was stripped from the organic phase.

EXAMPLE 2

Loading Capacity of Aqueous Polyphosphate Solution

Uranyl nitrate hexahydrate (2.3359 g) was dissolved in Poly N solution to produce a solution containing 11,075 ppm U. This spiked Poly N solution was contacted with agitation by a reciprocating shaker with an equal volume of a solution of 0.5 M D2EHPA/0.125 M TOPO in Kermac 470B (a refined kerosene) for three hours at ambient temperature. The uranium in an aliquot of the resultant oil layer was determined by colorimetric analysis to be 41 ppm. Thus less than 0.4% of the uranium in highly loaded Poly N solution was back extracted.

The ability of a solution to strip uranium is often expressed as a stripping coefficient, which is the ratio of the concentration of uranium in the aqueous layer to that in the organic layer at equilibrium. Although the stripping coefficient would normally be determined by contacting loaded organic with uranium-barren aqueous solution, the concentrations of uranium observed in this experiment may be used to calculate stripping coefficient, since the phases were contacted until equilibrium was presumed to have been established:

$$S_o^u = \frac{11{,}075}{41} = 270$$

A stripping coefficient of about 2 is considered satisfactory.

EXAMPLE 3

Loading Capacity of Dilute Polyphosphate Solution

The Poly N aqueous solution of Example 1 was diluted from 50 ml to 125 ml with deionized water. Uranyl nitrate hexahydrate (0.5917 g) was dissolved in a 25 ml portion of this dilute aqueous solution to produce a loaded dilute solution with a calculated uranium concentration of 11,221 ppm and a measured uranium concentration of 8,963 ppm. This discrepency is believed due to inaccuracy of the analytical technique at such high uranium concentrations. The uranium-loaded diluted Poly N solution was shaken on a Vortex mixer with half its volume of a solution of 0.5 molar D2EHPA and 0.125 molar TOPO in Kermac 470B kerosene for three minutes at 40° C. Analysis of the resulting aqueous phase showed 9,399 ppm uranium by volume with the increase over the initial concentration attributable to entrained solvent and the effect thereof on the colorimetric measurement.

It is apparent that relatively dilute polymeric phosphates can hold at least about 9,000 ppm uranium in contact with powerful extraction solvents.

EXAMPLE 4

Recovery of Uranium For Aqueous Polyphosphate Solution

The Poly N solution of Example 1 was diluted five fold with dionized water to 35 ppm uranium. The pH of this solution was then adjusted to 2 by addition of concentrated sulfuric acid. Chelating agents at the weight percents shown below were then added to six 15 ml aliquots of the dilute, acidified solution, which were then each hydrolyzed at 100°-105° C. for 90 hours. The appearance of the hydrolyzed samples was as shown below:

| Sample | Chelating Agent(s) | Level | Appearance After Hydrolysis |
|---|---|---|---|
| A | Tartaric Acid | 5% | Brown Gelatinous Precipitate |
| B | Oxalic Acid | 4% | Clear greenish-yellow solution |
| C | EDTA | 9% | Colorless solution with undissolved EDTA |
| D | Tartaric Acid<br>Oxalic Acid<br>EDTA | 5%<br>6%<br>9% | Greenish-yellow solution with undissolved EDTA |
| E | Citric Acid | 6% | Grey precipitate |
| F | None | — | White precipitate |

Any of the precipitates which preferentially contain the uranium could be leached or redissolved to recover the uranium.

A 10 milliliter aliquot of sample B was then extracted with half of its volume of 0.5 molar D2EHPA and 0.125 molar TOPO in kerosene and the uranium content of the raffinate measured and determined to be undetectable by colorimetric (and thus below 0.5 ppm). Therefore the entire 35 ppm in Sample B before hydrolysis must have been extracted into the organic solution.

What is claimed is:

1. A process of stripping uranium from an organic solution containing an organic extractant and said uranium which comprises:
   (a) contacting said organic solution with an aqueous solution of an inorganic polymeric phosphoric acid or salt thereof under conditions in which the inorganic polymeric phosphoric acid or salt thereof does not rapidly hydrolyze and in which uranium preferentially dissolves in the aqueous solution, and
   (b) recovering uranium from said aqueous solution by hydrolyzing said inorganic polymeric phosphoric acid or salt thereof to ortho phosphates.

2. The process of claim 1 where said organic extractant is selected from the group consisting of dialkylphosphoric acids, trialkylphosphates, dialkyl alkyl phosphonates, alkyl dialkylphosphinates, trialkyl phosphine oxides, mono- and di-esters of substituted phenol and phosphoric acid, tertiary and quaternary amines, and mixtures thereof.

3. The process of claim 1 further comprising re-extracting said uranium from said aqueous solution containing ortho phosphates by contacting said aqueous solution with a second organic solution containing an organic extractant.

4. The process of claim 3 wherein said organic extractant of said second organic solution is selected from the group consisting of dialkyl phosphoric acids, trialkylphosphates, dialkyl alkyl phosphonates, alkyl dialkylphosphonates, trialkyl phosphine oxides, mono and di-esters of substituted phenol and phosphoric acid, tertiary and quaternary amines, and mixtures thereof.

5. A process of stripping uranium from an organic solution containing an organic extractant and tetravalent or hexavalent uranium which comprises
   (a) contacting said organic solution at a temperature between about 0° and 100° C. and a pH at least about6 with an aqueous solution of an inorganic polymeric phosphoric acid or salt thereof, and
   (b) recovering said uranium from said aqueous solution by hydrolyzing said inorganic polymeric phosphoric acid or salt thereof to ortho phosphates.

6. The process of claim 5 wherein the temperature is at least about room temperature.

* * * * *